(12) United States Patent
Yamauchi et al.

(10) Patent No.: US 11,192,510 B2
(45) Date of Patent: Dec. 7, 2021

(54) WIRE HARNESS PROTECTOR

(71) Applicant: Yazaki Corporation, Tokyo (JP)

(72) Inventors: Akinori Yamauchi, Toyota (JP); Toru Kato, Toyota (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 16/986,528

(22) Filed: Aug. 6, 2020

(65) Prior Publication Data

US 2021/0039571 A1     Feb. 11, 2021

(30) Foreign Application Priority Data

Aug. 8, 2019 (JP) .............................. JP2019-145895

(51) Int. Cl.
*B60R 16/02* (2006.01)
*H02G 3/06* (2006.01)

(52) U.S. Cl.
CPC ....... *B60R 16/0215* (2013.01); *H02G 3/0691* (2013.01)

(58) Field of Classification Search
CPC ...... B60R 16/02; B60R 16/0215; H02G 3/06; H02G 3/0691
USPC ...................................................... 174/72 A
See application file for complete search history.

(56) References Cited

U.S. PATENT DOCUMENTS

| 7,692,095 | B2 | 4/2010 | Katsumata et al. |
| 9,270,101 | B2 | 2/2016 | Iio |
| 2001/0004022 | A1 | 6/2001 | Kobayashi |
| 2005/0217888 | A1* | 10/2005 | Arai ..................... H02G 3/0418 174/72 A |
| 2012/0217033 | A1* | 8/2012 | Agusa ................. B60R 16/0215 174/68.3 |
| 2016/0186803 | A1* | 6/2016 | Terada ................. B60N 2/0722 384/15 |
| 2017/0331263 | A1 | 11/2017 | Matsumura et al. |
| 2019/0123530 | A1 | 4/2019 | Tokuyama et al. |

FOREIGN PATENT DOCUMENTS

| CN | 107112731 A | 8/2017 |
| JP | 5-025919 U | 4/1993 |
| JP | H118922 A | 1/1999 |

* cited by examiner

*Primary Examiner* — Timothy J Thompson
*Assistant Examiner* — Michael F McAllister
(74) *Attorney, Agent, or Firm* — Sughrue Mion, PLLC

(57) ABSTRACT

A wire harness protector includes a protector body and a cover. The protector body is configured to accommodate a corrugated tube extending in a front-rear direction and through which a wire harness is inserted. The cover is configured to cover an opening of the protector body. A first front end being one of a front end of the protector body or a front end of the cover is arranged rearward of a second front end being the other of the front ends. A portion of the wire harness protector located at the first front end includes a first rib configured to hold the corrugated tube. A portion of wire harness the protector facing the first front end and located rearward of the second front end includes a second rib configured to hold the corrugated tube.

4 Claims, 4 Drawing Sheets

WIRE HARNESS PROTECTOR

CROSS REFERENCE TO RELATED APPLICATION

The present application is based on, and claims priority from the prior Japanese Patent Application No. 2019-145895, filed on Aug. 8, 2019, the entire contents of which are incorporated herein by reference.

TECHNICAL FIELD

The disclosure is related to a wire harness protector that fixes a corrugated tube through which a wire harness is inserted to accommodate the corrugated tube in a packing box.

BACKGROUND

Japanese Utility Model Application Publication No. H5-25919 describes a wire harness protector that fixes a corrugated tube through which a wire harness is inserted to accommodate the corrugated tube in a packing box. The wire harness protector includes: a protector body that has a substantially U-shaped cross section and accommodates the corrugated tube through which the wire harness formed from electric wires are inserted; and a cover that covers an opening of the protector body. The front end of the protector body and the front end of the cover are arranged at the same position.

The route of the corrugated tube is regulated by using the wire harness protector in order to secure a vehicle mounting performance of the wire harness. On the other hand, when the wire harness protector is transported to a factory or the like where the wire harness protector is mounted on a vehicle, the wire harness protector is accommodated in a packing box with the corrugated tube exposed from the front end of the protector body being folded outward and upward along the front end of the protector body.

SUMMARY

When the wire harness protector is accommodated in the packing box, the corrugated tube is folded in a state of being largely projected outward from the front end of the protector body. Therefore, the size of the packing box for transportation of the wire harness is increased, the amount to be transported is increased, and a large storage space is required. Thus the costs are increased accordingly.

The disclosure is directed to a wire harness protector that is capable of reducing transportation costs and storage costs.

A wire harness protector in accordance with some embodiments includes: a protector body configured to accommodate a corrugated tube extending in a front-rear direction and through which a wire harness is inserted; and a cover configured to cover an opening of the protector body. A first front end being one of a front end of the protector body or a front end of the cover is arranged rearward of a second front end being the other of the front ends. A portion of the wire harness protector located at the first front end includes a first rib configured to hold the corrugated tube. A portion of the wire harness protector facing the first front end and located rearward of the second front end includes a second rib configured to hold the corrugated tube.

According to the above configuration, the corrugated tube through which the wire harness is inserted is projected outward of the protector body from the first front end being one of the front ends of the protector body and the cover that is located rearward without being projected outward of the protector body from the second front end being the other of the front ends that is located forward. Therefore, the wire harness protector can be accommodated in a packing box smaller than the packing box for the conventional wire harness protector, whereby transportation costs and storage costs are reduced accordingly to achieve low cost products.

DETAILED DESCRIPTION

Various embodiments will be described hereinafter with reference to the accompanying drawings.

Figure 1:
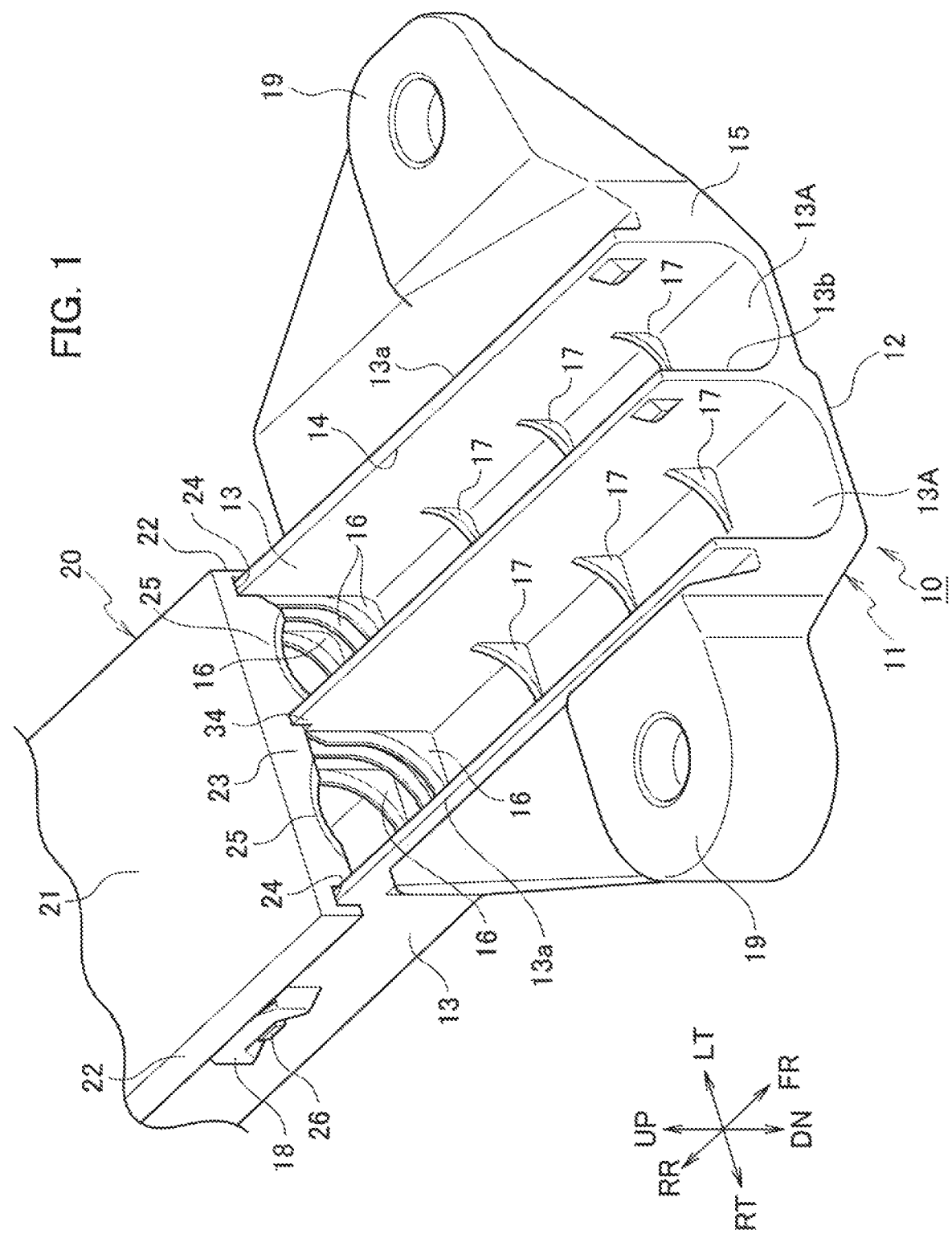
FIG. 1 is a perspective view of a main portion of a wire harness protector according to an embodiment.
Figure 2:
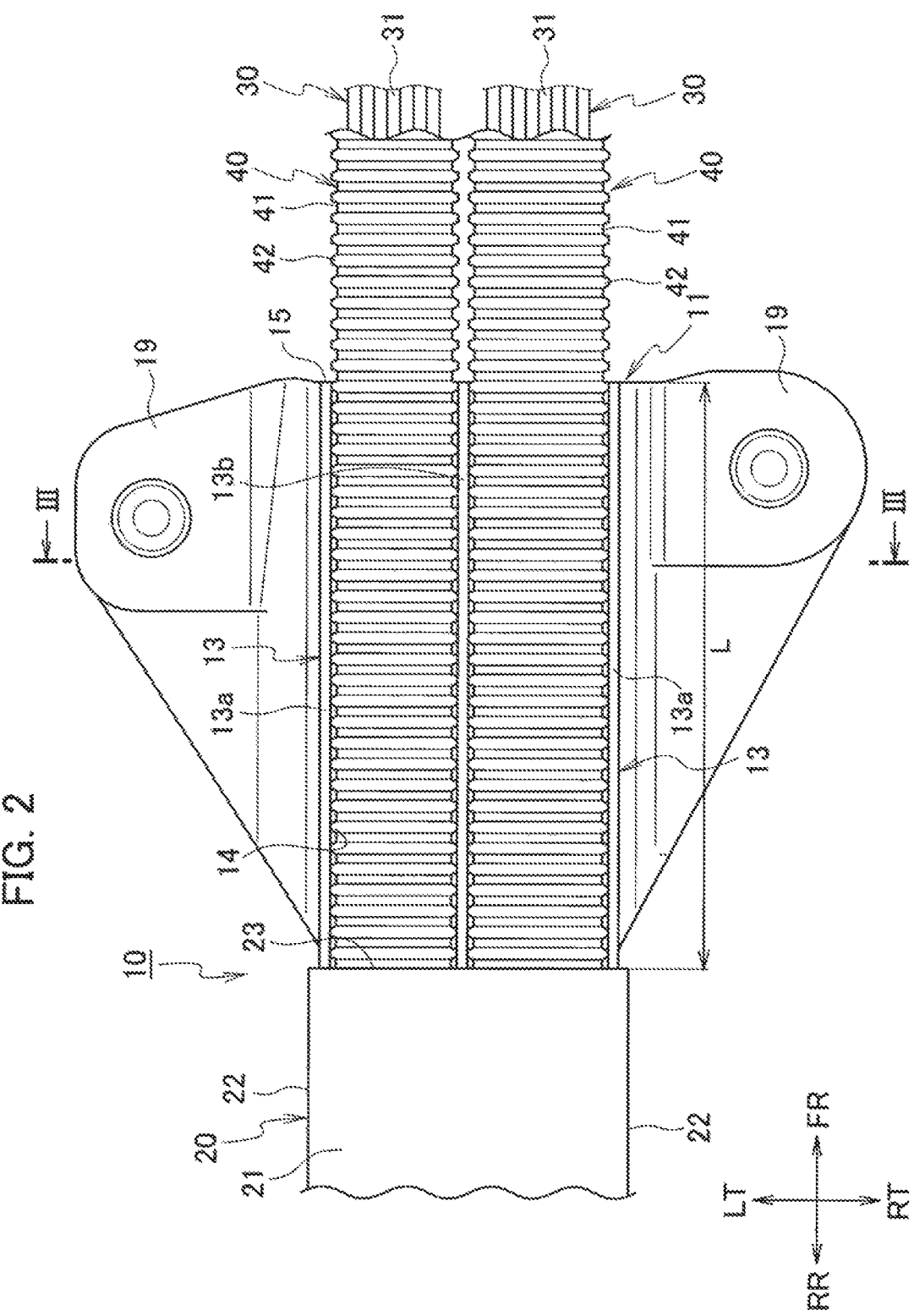
FIG. 2 is a plan view of the main portion of the wire harness protector illustrated in FIG. 1.
Figure 3:
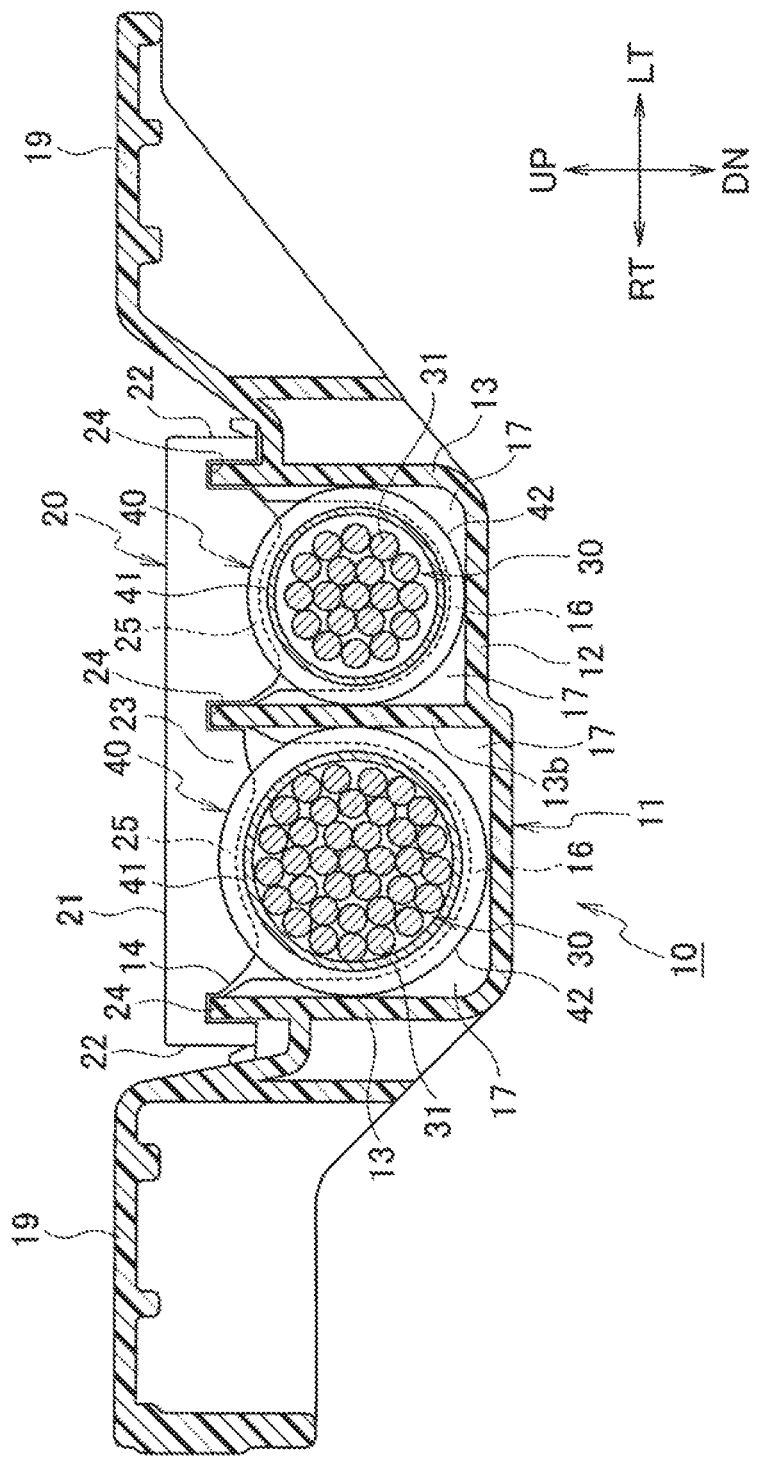
FIG. 3 is a cross-sectional view taken along the line III-III in FIG. 2.
Figure 4:
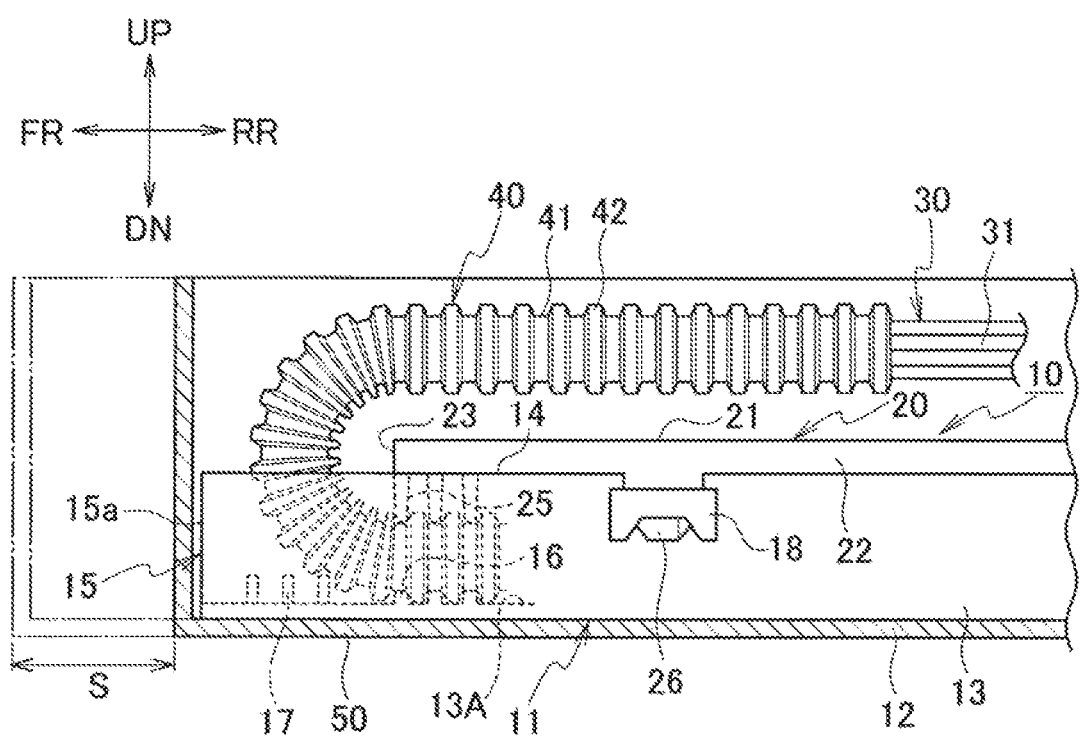
FIG. 4 is a cross-sectional view illustrating a state where the wire harness protector illustrated in FIG. 1 is accommodated in a packing box.

FIG. 1 is a perspective view of a main portion of a wire harness protector 10 according to an embodiment of the present invention. FIG. 2 is a plan view of the main portion of the wire harness protector 10. FIG. 3 is a cross-sectional view taken along the line III-III in FIG. 2. FIG. 4 is a cross-sectional view illustrating a state where the wire harness protector 10 is accommodated in a packing box. FIGS. 2 and 3 illustrate a state where a corrugated tube 40 extends forward without being folded (a state where the wire harness protector 10 is mounted on a vehicle). In FIGS. 1 to 4, the directions of right, left, up, down, front, and rear are denoted by RT, LT, UP, DN, FR, and RR, respectively.

As illustrated in FIGS. 1 to 4, the wire harness protector 10 includes a protector body 11 made of synthetic resin and a cover 20 made of synthetic resin. The protector body 11 has a bottom wall 12 and both side walls 13. The protector body 11 accommodates two large and small corrugated tubes 40 through which the wire harnesses 30 are inserted respectively. The cover 20 covers an opening 14 between upper ends 13a of the both side walls 13 of the protector body 11.

As illustrated in FIGS. 1 to 3, the protector body 11 has a pair of tube chambers 13A partitioned with a partition wall 13b. The partition wall 13b is formed integrally projecting from the bottom wall 12 between the both side walls 13. The tube chambers 13A extend in parallel in a longitudinal direction (front-rear direction). The corrugated tubes 40 extending in the front-rear direction and through which the wire harnesses 30 are inserted respectively are accommodated in the tube chambers 13A respectively.

As illustrated in FIGS. 1 and 3, the cover 20 has a ceiling wall 21, both side walls 22 which cover the both side walls 13 of the protector body 11, and a front end 23 bridged between ends of the both side walls 22 and located at a front side of the cover 20. The front end 23 of the cover 20 is located rearward of a front end 15 of the protector body 11 located at a front side of the protector body 11. That is, as illustrated in FIGS. 1 and 2, the total length of the cover 20 is shorter than the total length of the protector body 11. The front end 23 of the cover 20 is arranged at a position rearward of the front end 15 of the protector body 11 by a length L.

As illustrated in FIGS. 1 to 3, a plurality (three in the embodiment) of arc plate-shaped ribs 25 and a plurality (three in the embodiment) of arc plate-shaped ribs 16 which engage with annular concave portions 41 of a convexo-concave outer surface of the corrugated tube 40 and hold the corrugated tube 40 are respectively formed in the front end 23 of the cover 20 and the portion of each tube chamber 13A of the protector body 11 facing the front end 23. The front end 23 of the cover 20 is formed with recesses 24 into which the upper ends 13a of the side walls 13 of the protector body 11 and the upper end of the partition wall 13b are fitted respectively.

As illustrated in FIG. 1, a plurality (three in the embodiment) of pairs of left and right protrusions 17 serving also as reinforcing ribs which lock annular convex portions 42 of the convexo-concave outer surface of the corrugated tube 40 and hold the corrugated tube 40 are integrally formed at a predetermined distance at the portions (located rearward of the front end 15) of each tube chamber 13A between the front end 15 of the protector body 11 and the front end 23 of the cover 20.

When the two corrugated tubes 40 are accommodated in the wire harness protector 10, as illustrated in FIG. 2, the two corrugated tubes 40 are accommodated in the tube chambers 11A of the protector body 13 respectively so as to extend forward and are arranged so as to be exposed from the opening 14 between the upper ends 13a of the both side walls 13 of the protector body 11 located forward of the front end 23 of the cover 20. When the wire harness protector 10 is accommodated in the packing box 50 for transportation, as illustrated in FIG. 4, the two corrugated tubes 40 in the state illustrated in FIG. 2 are respectively folded (bent) outward and upward of the protector body 11 so as to extend rearward from the ribs 16 and 25 along the ceiling wall 21 of the cover 20. In this state, the protector body 11 is accommodated in the packaging box 50 of a smaller size than the conventional one by a portion (the conventional projection length of S) in which the folded portions of the corrugated tubes 40 do not project forward from an end face 15a of the front end 15 of the protector body 11.

As illustrated in FIG. 1, frame-shaped engagement portions 18 are integrally formed on the left and right sides of the both side walls 13 of the protector body 11. A plurality of mounting brackets 19 to be mounted to a vehicle body or the like are integrally formed on the right and left sides of both side walls 13 of the protector body 11. Hook-shaped engaging claws (locking portion) 26 to be engaged with and disengaged from the frame-shaped engaging portions 18 of the protector body 11 are integrally formed on the both side walls 22 of the cover 20 so as to project therefrom. As illustrated in FIGS. 2 and 4, the wire harnesses 30 include bundled electric wires 31 respectively.

According to the embodiment, as illustrated in FIG. 4, the two corrugated tubes 40 exposed from the opening 14 between the both side walls 13 of the protector body 11 located forward of the front end 23 of the cover 20 are accommodated in the packing box 50 for transportation of wire harnesses in the state where the two corrugated tubes 40 are respectively folded outward and upward of the protector body 11 from the front end 23 of the cover 20 along the ceiling wall 21. As a result, the wire harness protector 10 can be accommodated and conveyed in the packing box 50 of a smaller size than the conventional one by the amount that the folded portions of the corrugated tubes 40 do not project forward from the end face 15a of the front end 15 of the protector body 11, that is, by the projecting length S of the folded portion of the conventional corrugated tube. Thus, since the wire harness protector 10 having a size extending to a route regulating portion necessary for securing the vehicle mounting performance can be accommodated in the packing box 50 smaller than the conventional packing box, the transportation and storage costs can be significantly reduced. Thus, low cost products can be achieved.

According to the embodiment, the protrusions 17 for holding the corrugated tubes 40 are formed at the portions rearward of the front end 15 of the protector body 11 and forward of the ribs 16, 25. As a result, as illustrated in FIGS. 2 and 3, the movement of the corrugated tubes 40 in the front-rear direction can be easily and reliably regulated after the corrugated tubes 40 are mounted on the vehicle.

According to the embodiment, the protector body 11 has the pair of tube chambers 13A which accommodate the two large and small corrugated tubes 40 respectively and the two large and small corrugated tubes 40 are folded outward and upward of the protector body 11 from the front end 23 of the cover 20 along the ceiling wall 21. Thus, the corrugated tubes 40 through which the wire harnesses 30 are inserted can be held by the ribs 16, 25 in a form matching the specifications, and can be easily and reliably folded. Further, the ribs 16 and the ribs 25 provided to face each other improve the foldability of the corrugated tubes 40 when the corrugated tubes 40 through which the wire harnesses 30 are inserted are folded outward and upward of the protector body 11. Thus, the amount of the corrugated tubes 40 projecting forward and upward can be suppressed more than when there is no rib.

According to the embodiment, the protector body 11 having the size extending to the route regulating portion necessary for securing the vehicle mounting performance can be accommodated in the small-sized packing box 50 with a simple structure in which the front end 23 of the cover 20 is located rearward of the front end 15 of the protector body 11. Therefore, the protector body 11 having a simple structure same as the conventional one or a simpler structure more than the conventional one can be used and the costs can be reduced accordingly.

In the embodiment, the cover 20 is formed to have the length shorter than the length of the protector body 11 so that the front end 23 of the cover 20 is located rearward of the front end 15 of the protector body 11 and the corrugated tubes 40 do not project forward from the front end 15 of the protector body 11 when the corrugated tubes 40 are folded from the front end 23 of the cover 20. However, for example, a rectangular recess may be formed rearward from the forward end of the cover 20 formed to have the same length as the protector body 11 and the corrugated tubes 40 may be folded from the edge end of the recess as the front end 23 of the cover 20. Even in this case, the corrugated tubes 40 can be prevented from projecting forward from the front end 15 of the protector body 11.

In the embodiment, the front end 23 of the cover 20 is formed to be located rearward of the front end 15 of the protector body 11. However, for example, the front end 15 of the protector body 11 may be formed to be located rearward of the front end 23 of the cover 20. In this case, the protrusions 17 are formed at portions located rearward of the front end 23 of the cover 20 and the corrugated tubes 40 are folded outward at the front end 15 of the protector body 11.

In the embodiment, the pair of tube chambers 13A which accommodate the two corrugated tubes 40 are formed in the protector body 11. However, for example, one tube chamber which accommodates one corrugated tube or three or more tube chambers which accommodate three or more corrugated tubes may be formed in the protector body 11.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A wire harness protector comprising:
   a protector body configured to accommodate a corrugated tube extending in a front-rear direction and through which a wire harness is inserted; and
   a cover configured to cover an opening of the protector body, wherein
   a first front end being one of a front end of the protector body or a front end of the cover is arranged rearward of a second front end being the other of the front ends,
   a portion of the wire harness protector located at the first front end includes a first rib configured to hold the corrugated tube,
   a portion of the wire harness protector facing the first front end and located rearward of the second front end includes a second rib configured to hold the corrugated tube, and
   a portion of the wire harness protector between the second rib and the second front end includes at least one protrusion configured to hold the corrugated tube.

2. A wire harness protector comprising:
   a protector body configured to accommodate a corrugated tube extending in a front-rear direction and through which a wire harness is inserted; and
   a cover configured to cover an opening of the protector body, wherein
   a first front end being one of a front end of the protector body or a front end of the cover is arranged rearward of a second front end being the other of the front ends,
   a portion of the wire harness protector located at the first front end includes a first rib configured to hold the corrugated tube,
   a portion of the wire harness protector facing the first front end and located rearward of the second front end includes a second rib configured to hold the corrugated tube, and
   the protector body has a tube chamber configured to accommodate at least two of the corrugated tubes each folded from the first front end toward an outside of the protector body.

3. A wire harness protector comprising:
   a protector body configured to accommodate a corrugated tube extending in a front-rear direction and through which a wire harness is inserted; and
   a cover configured to cover an opening of the protector body, wherein
   a first front end being one of a front end of the protector body or a front end of the cover is arranged rearward of a second front end being the other of the front ends,
   a portion of the wire harness protector located at the first front end includes a first rib configured to hold the corrugated tube,
   a portion of the wire harness protector facing the first front end and located rearward of the second front end includes a second rib configured to hold the corrugated tube,
   the first front end is the front end of the cover, and
   the second front end is the front end of the protector body.

4. The wire harness protector according to claim 2, wherein the protector body with the at least two of the corrugated tubes each folded from the first front end toward the outside of the protector body is accommodatable in a packing box.

* * * * *